Patented May 19, 1931

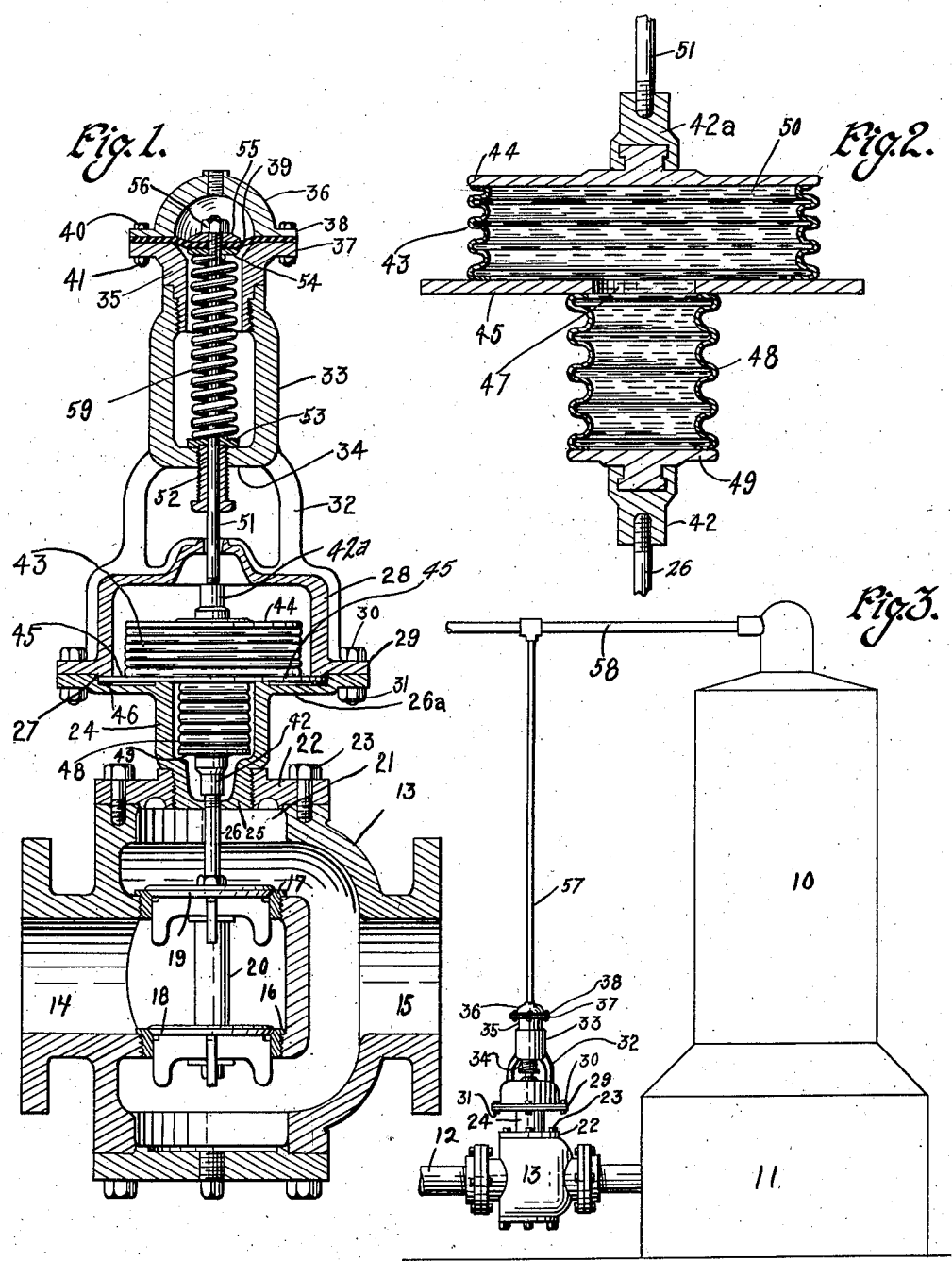

1,805,802

UNITED STATES PATENT OFFICE

LYLE W. BROWNE, OF MARSHALLTOWN, IOWA, ASSIGNOR TO THE FISHER GOVERNOR COMPANY, INC., OF MARSHALLTOWN, IOWA

SENSITIVE FUEL GOVERNOR

Application filed April 14, 1926. Serial No. 102,087.

The object of my invention is to provide an ultra-sensitive fuel governor for gas used for heating steam boilers and the like.

More particularly, it is my object to provide an ultra-sensitive control for a valve in a fuel line, whereby the valve may be controlled according to the steam pressure in the boiler, and particularly whereby the action of a pressure operated diaphragm is transmitted to a valve by means of a special type of bellows whereby short travel of the diaphragm effects substantially greater travel of the valve.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a vertical, sectional view through a governor embodying my invention.

Figure 2 is an enlarged, vertical, sectional view through the bellows structure; and Figure 3 is an elevation of the device as applied to a boiler.

I have in the accompanying drawings and will in this specification illustrate my sensitive governor as applied to a boiler assembly, but it will be understood that it is not my intention to limit myself to this particular use of the device.

In the accompanying drawings, I have used the reference numeral 10 to indicate generally a boiler having the combustion chamber 11. Gaseous fuel is supplied through a pipe 12 to the combustion chamber.

Interposed in the pipe 12 is my governor. It includes a valve body 13 having the inlet passage 14 and the outlet or discharge passage 15. On the interior of the valve body 13 are the spaced valve seats 16 and 17. Valves 18 and 19 are arranged to coact therewith. These valves are connected by a post 20.

The body 13 has an opening 21 in its top ordinarily closed by a removable head 22. The head is fastened to the casing by means of stud bolts 23.

A tubular member 24 is screwed into the upper end of the head 22 and has the closed lower end 25. The tubular member 24 is open at its upper end and has the annular flange 26a provided at its outer part with the annular shoulder 27.

Above the flange 26a is a casing 28 having in its lower part an annular outwardly projecting flange 29, which rests on the shouldered portion of the flange 26, and is secured thereto by bolts 30 and nuts 31.

Spaced arms 32 extend upwardly from the upper part of the casing 28 and support a tubular casing 33, having the lower closed end 34. Screwed into the upper end of the casing 33 is a tubular, lower portion 35 of a diaphragm chamber, which has the upper portion 36.

The diaphragm chamber members 35 and 36 have the coacting, outwardly projecting flanges 37 and 38.

A flexible diaphragm 39 has its edge received between the flanges 37 and 38. The diaphragm and said flanges are fastened together by means of bolts 40 and nuts 41.

The upper valve 19 has a stem 26 slidably projecting through the lower end 25 of the tubular member 24. On the upper end of the stem 26 within the casing 24 is screwed a valve stem connection 42.

Received within the casing 28 is a metal bellows 43, having a rigid plate 44 forming its top and a rigid plate 45 forming its bottom.

The outer edge of the plate 45 rests upon the gasket 46 below the edge of the casing 28, as shown in Figure 1.

The plate 45 forming the bottom of the bellows 43 has a central opening 47, shown in Figure 2.

Secured to the underside of the plate 45 and received in the casing 24 is a second metal bellows 48, which communicates with the opening 47 and has the rigid bottom member 49.

The bellows 43 and 48 are permanently sealed and contain a liquid 50 of material, which will not freeze in any ordinary temperature, and which while in liquid form has very little contraction or expansion.

Kerosene for example might be used for the purpose.

The plate 49 forming the bottom or head of the lower, smaller bellows is connected with the valve stem connection 42 as shown in Figure 2.

Connected with the head or top 44 of the larger bellows 43 is a similar valve stem connection 42a, into which is screwed the lower end of a plunger stem 51. This plunger stem 51 extends through the top of the casing 28 and through a screw plug guide 52 mounted in the bottom of the casing 33, and through the spring seat 53, resting on the bottom of the casing 33 or on the top of the member 52 and thence upwardly through the diaphragm 39.

A diaphragm head 54 is arranged below the diaphragm 39 on the plunger stem 51. On the upper end of the plunger stem 51 above the diaphragm is a diaphragm head or plate 55 and screwed onto the stem 51 above the head 55 is a nut 56.

The upper part of the diaphragm chamber is in communication by means of pipes 57 and 58 with the steam chamber or boiler 10.

It may be said that in general shape, the bellows 43 is of greater diameter and of less depth than the bellows 48. It should also be noted that the two bellows are so calibrated that the larger one 43 has several times, perhaps seven times, more cubic content than the smaller one 48.

Between the lower diaphragm head 54 and the spring seat 53 is a coil spring 59 mounted on the stem 51. Its tension may be regulated by means of the screw plug 52.

The suggested use to which my governor is put is the controlling or regulating of the flow of gas to the fire box of the boiler, in order to provide such a varying quantity of fuel as to maintain constant given steam pressure under varying conditions of the load.

An ordinary standard constant pressure valve embodying lever and weight or spring-actuated mechanism could not be used, unless some means were brought to bear on the regulator that would multiply the travel of the valve with relation to the movement of the diaphragm to which the steam pressure is applied.

In order to thus multiply or increase the distance of the movement of the diaphragm when that movement is applied to the valve, I have provided the arrangement of the two bellows as shown.

Assuming that the spring 59 is set to maintain a constant desired pressure on the diaphragm, and that the diaphragm on its opposite side is subject to pressure from the boiler, then it will be seen that when the boiler pressure goes down, the spring 55 will raise the diaphragm, and through the co-operation of the stem 51, the two bellows and the stem 26 will open the valve to allow additional fuel to be supplied to the combustion chamber of the boiler.

When the boiler pressure increases somewhat, its pressure on the diaphragm 39 overcomes the tension of the spring 59 and forces the upper head 44 of the bellows 43 downwardly.

I find that with the bellows in substantially the proportions shown herein, in which for example the upper bellows is five and seven-eighths inches in diameter while the lower bellows is two and one-half inches in diameter, and the upper bellows is one and one-half inches in depth, while the lower bellows is two inches in depth, and the capacity of the upper bellows is approximately seven times that of the lower bellows, the movement of the head 44 will be multiplied approximately seven times, when it is transmitted to the head 49.

Thus a movement of the diaphragm and of the head 44 of one-sixteenth of an inch will cause approximately seven-sixteenths of an inch movement of the head 49 and of the valve.

This greatly speeds up the movement of the valve with relation to the movement of the diaphragm, and makes it possible to regulate the supply of fuel, so as to maintain the steam pressure with comparatively little variation from the normal pressure desired. By simply reversing the relative position of the two bellows, it will be seen that the movement of the valve would be relatively less than that of the diaphragm.

It will, of course, be understood that the proportions of the parts and the details of the structure may be changed, and that the uses to which my device may be put might be considerably extended, and it is my purpose to cover by my claim any modifications in form or use of mechanical equivalents in which my invention may be embodied, and any analogous uses to which it may be put, so far as such modifications or uses may be included within the real scope of my invention and of my claim.

I claim as my invention:

In a governor valve structure, a valve proper including a valve body, a valve stem, a disk, a small bellows affixed to one side of said disk and a large bellows to the other side thereof, said bellows being hydraulically connected together, a frame affixed to said valve body, means for securing said disk to the intermediate portion of said frame, a diaphragm housing carried by the outer end of said frame, a diaphragm therein, an operative connection between said diaphragm and said large bellows and means for applying pressure to said diaphragm from a source independent of the pressure within said valve structure.

Des Moines, Iowa, February 4, 1926.

LYLE W. BROWNE.